(12) United States Patent
Painter et al.

(10) Patent No.: US 9,849,896 B1
(45) Date of Patent: Dec. 26, 2017

(54) SYSTEMS AND METHODS FOR MANAGING RAILCAR USAGE

(71) Applicant: BNSF Railway Company, Fort Worth, TX (US)

(72) Inventors: Steven Mitchell Painter, Fort Worth, TX (US); Martin Andrew Schlenker, Grapevine, TX (US); Robert Joseph Saylor, Decatur, TX (US); Michelle Rae Flanery, Haslet, TX (US); Brandon Jay Archambeau, Fort Worth, TX (US); Gregory Lee Palcich, Keller, TX (US); Joshua Landon Gary, Fort Worth, TX (US); Vipin Gangadhar Kohale, Fort Worth, TX (US); Robert Wayne Lease, Fort Worth, TX (US); Caleb Mikel Peterson, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 556 days.

(21) Appl. No.: 14/497,473

(22) Filed: Sep. 26, 2014

Related U.S. Application Data

(60) Provisional application No. 61/886,818, filed on Oct. 4, 2013.

(51) Int. Cl.
| | |
|---|---|
| B61L 27/00 | (2006.01) |
| G01C 21/20 | (2006.01) |
| B61B 1/00 | (2006.01) |
| G06Q 50/28 | (2012.01) |
| G06Q 10/08 | (2012.01) |
| G06Q 10/06 | (2012.01) |

(52) U.S. Cl.
CPC .......... *B61L 27/0011* (2013.01); *B61B 1/005* (2013.01); *G01C 21/20* (2013.01); *G06Q 10/08* (2013.01); *G06Q 50/28* (2013.01); *G06Q 10/06313* (2013.01); *G06Q 10/06314* (2013.01)

(58) Field of Classification Search
None
See application file for complete search history.

(56) References Cited

U.S. PATENT DOCUMENTS

| | | | |
|---|---|---|---|
| 9,304,006 B2 * | 4/2016 | Berlingerio | G01C 21/3415 |
| 2002/0082893 A1 * | 6/2002 | Barts | G06Q 10/063 705/334 |
| 2006/0047379 A1 * | 3/2006 | Schullian | B61L 27/0077 701/19 |

(Continued)

*Primary Examiner* — Redhwan K Mawari
*Assistant Examiner* — Edward Torchinsky

(57) ABSTRACT

A system for managing the transportation of crude oil by rail includes a user terminal having a display screen and a processing system coupled to the user terminal through a communications link. The processing system is operable to generate a user interface on the display screen of the user terminal receiving input information from a user, including information indicating a loading facility for loading a selected set of railcars and an unloading facility for unloading the selected set of railcars. The processing system is further operable to forecast an arrival time for the set of cars at the loading facility and an arrival time for the set of cars at the unloading facility and display the forecasted arrival times at the loading and unloading facilities on the display screen of the user terminal.

32 Claims, 15 Drawing Sheets

(56) References Cited

U.S. PATENT DOCUMENTS

| | | | |
|---|---|---|---|
| 2008/0077464 A1* | 3/2008 | Gottlieb | G06Q 10/08 |
| | | | 705/28 |
| 2009/0192864 A1* | 7/2009 | Song | G06Q 10/04 |
| | | | 705/28 |
| 2010/0088142 A1* | 4/2010 | El-Bakry | G06Q 10/06312 |
| | | | 705/7.22 |
| 2010/0332273 A1* | 12/2010 | Balasubramanian | G06Q 10/08 |
| | | | 705/332 |
| 2012/0010803 A1* | 1/2012 | Min | G08G 1/123 |
| | | | 701/117 |
| 2014/0149164 A1* | 5/2014 | Yumbe | G06Q 10/063114 |
| | | | 705/7.15 |
| 2014/0278704 A1* | 9/2014 | Elizondo | G06Q 10/06313 |
| | | | 705/7.23 |
| 2015/0051941 A1* | 2/2015 | Bell | G06Q 10/06313 |
| | | | 705/7.25 |
| 2016/0239023 A1* | 8/2016 | Rylander | G05D 1/0223 |

* cited by examiner

Facility Parameters

| | Dwell (hrs) | Loading Racks | BBLS/Car | Max Cars/Train |
|---|---|---|---|---|
| Loading Facilities | | | | |
| BERTHOLD, ND | 24 | 1 | 695 | 100 |
| FRYBURG, ND | 24 | 1 | 695 | 100 |
| Unloading Facilities | | | | |
| ALBANY, NY | 24 | 1 | 695 | 100 |
| PHILADELP, PA | 24 | 1 | 695 | 100 |

Blackout Dates

Blackout at [PHILADELP, PA ▼] from [06/10/2013 ▼] at [12:00 AM] to [06/14/2013 ▼] at [12:00 AM] [Add]

● BERTHOLD, ND

Blackout from [06/12/2013 ▼] at [12:00 AM] to [06/07/2013 ▼] at [12:00 AM]

FIG. 4

| Shipments | | | | | | |
|---|---|---|---|---|---|---|
| Set | Customer | Cars | Load At | Arrival | Unload At | Arrival |
| NEW SET 11 | | 108 | TIOGA, ND-HESS | 06/18 00:00 | HAYTI, MO-MAR | 06/22 10:10 |
| NEW SET 10 | | 102 | EPPING, ND-INEF | 06/19 00:00 | ALBANY, NY-BU | 06/25 14:00 |
| NEW SET 1 | | 103 | ELAND, ND-BAKI | 06/22 00:00 | REYBOLD, DE-PE | 06/28 01:03 |
| NEW SET 4 | | 100 | BERTHOLD, ND-I | 06/23 00:00 | ALBANY, NY-BU | 06/29 18:00 |
| NEW SET 5 | | 103 | REPUBLIC, ND-B | 0 | | |
| NEW SET 9 | | 100 | BERTHOLD, ND-I | 0 | | |
| NEW SET 6 | | 103 | EPPING, ND-INEF | 0 | | |
| NEW SET 8 | | 100 | BERTHOLD, ND-I | 0 | | |
| NEW SET 11 | | 108 | TIOGA, ND-HESS | 0 | | |
| NEW SET 7 | | 100 | EPPING, ND-INEF | 0 | | |
| NEW SET 10 | | 102 | ELAND, ND-BAKI | 0 | | |
| NEW SET 1 | | 103 | BERTHOLD, ND-I | 07/06 06:00 | ALBANY, NY-BU | 07/13 00:00 |
| NEW SET 4 | | 100 | BERTHOLD, ND-I | 07/07 17:39 | PHILADELP, PA-F | 07/15 07:17 |
| NEW SET 5 | | 103 | REPUBLIC, ND-B | | | |

Search for Target Date

Enter the facility and target date:

Facility: BERTHOLD, ND  ✕ — 602

Target Date: 06/04/2013   YYYY-MM-DD
603

Cancel    Find

Shipments ⊙ Loading Arrival ◉ Unloading Arrival

| Set | Owner | Cars | Load At | Arrival | Unload At | Arrival | | Theoretical lane and ETA |
|---|---|---|---|---|---|---|---|---|
| 2012_99 | Ann | 92 | ELAND, ND ▼ | 04/12 12:05 | REYBOLD, DE ▼ | 04/18 08:38 | | #1 - Eland to Hayti - Apr. 18th |
| 2012_140 | Ann | 94 | MANITOU, ND ▼ | 04/12 20:34 | REYBOLD, DE ▼ | 04/19 06:50 | | #2 - Manitou to Hayti - Apr. 18th |
| 2013_019 | Ann | 100 | ELAND, ND ▼ | 04/13 22:26 | REYBOLD, DE ▼ | 04/19 18:59 | | #3 - Eland to Hayti - Apr. 19th |
| 2013_007 | Ann | 104 | MANITOU, ND ▼ | 04/14 07:29 | ST JAMES, LA ▼ | 04/22 02:08 | | #4 - Manitou to Hayti - Apr. 20th |
| 2013_031 | Ann | 100 | MANITOU, ND ▼ | 04/16 00:02 | REYBOLD, DE ▼ | 04/22 13:45 | | #5 - Manitou to Hayti - Apr. 22th |
| 2012_99 | Ann | 92 | ELAND, ND ▼ | 04/24 01:42 | REYBOLD, DE ▼ | 04/29 22:15 | | #6 - Eland to Hayti - Apr. 30th |
| 2012_140 | Ann | 94 | MANITOU, ND ▼ | 04/25 05:52 | REYBOLD, DE ▼ | 05/01 16:09 | | #7 - Manitou to Hayti - May 1st |

⊕ Add Set  🔍 Search  ▽ Filter

FIG. 6B

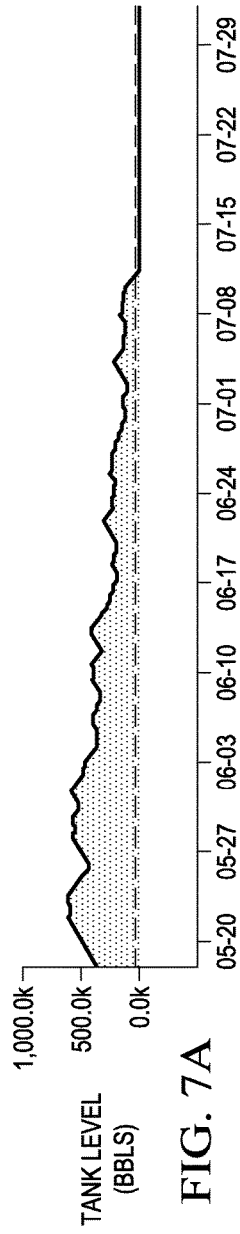
FIG. 7A
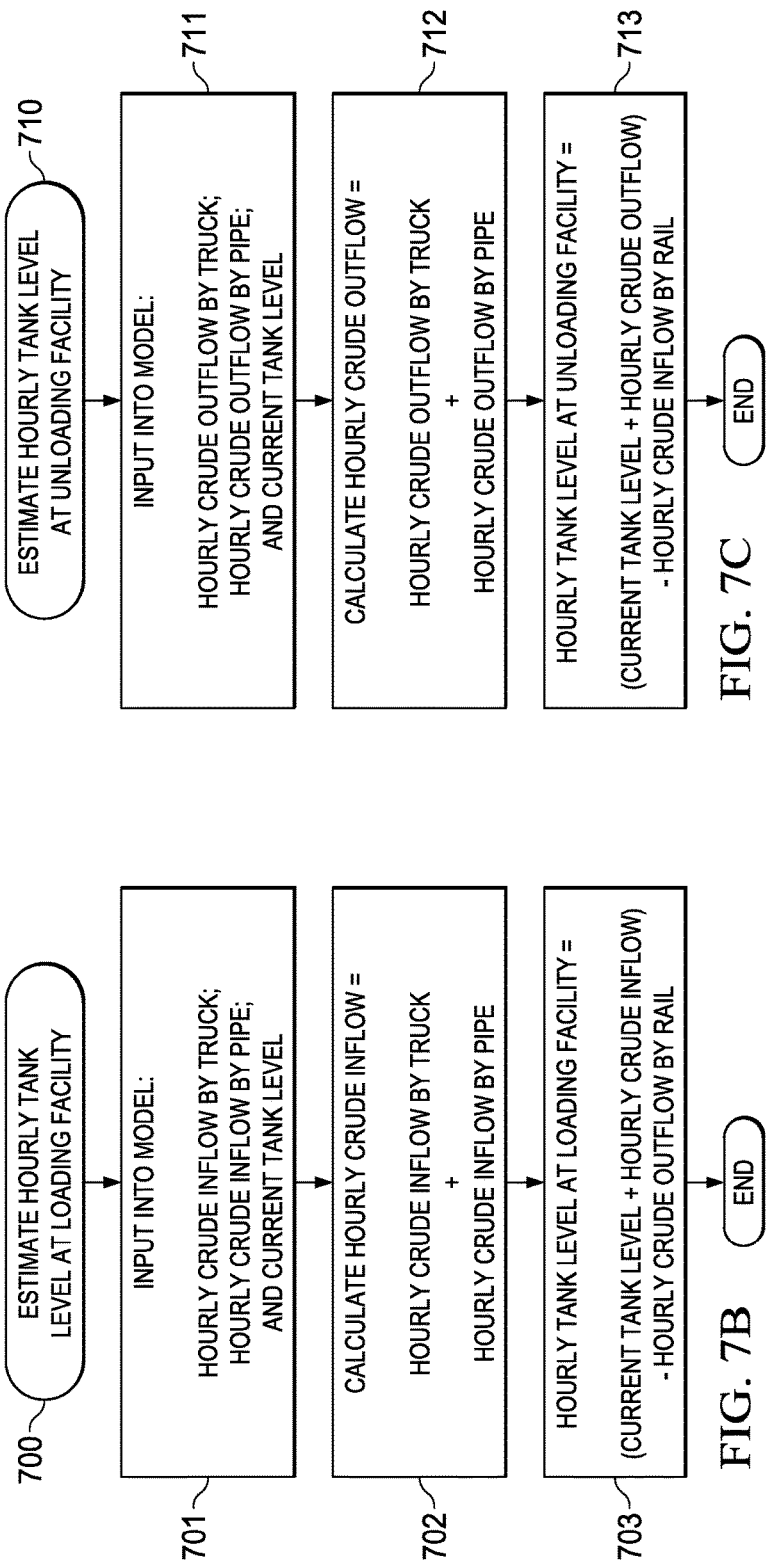
FIG. 7B
FIG. 7C

SYSTEMS AND METHODS FOR MANAGING RAILCAR USAGE

CROSS-REFERENCE TO RELATED APPLICATION

The present application claims the benefit of U.S. Provisional Patent Application Ser. No. 61/886,818, filed Oct. 4, 2013.

FIELD OF INVENTION

The present invention relates in general to railroad management techniques, and in particular to systems and methods for managing railcar usage.

BACKGROUND OF INVENTION

Railroad customers, particularly those having to ship large amounts of product on a relatively tight time schedule, have a critical need for reliable rail plans. These rail plans should provide the railroad customer, as well as the servicing railroad, with reliable information about the resources available at a given time and place (e.g., the sets of cars available to service a particular route), accurate forecasts of train arrival and departure times at product loading and unloading facilities, and potential bottlenecks within the product transportation system (e.g., Facility queuing and dwell times, among other things).

Current rail planning systems, however, are subject to a number of problems. Typically, each individual customer uses multiple unlinked spreadsheets and manual calculations of the various parameters to generate rail plans. Moreover, these plans are normally not based on real set cycle data nor account for actual train movements. As a result, not only have the railroad customers struggled to generate reliable rail plans, but the servicing railroad is faced with the resulting burden of reconciling and proofreading spreadsheets from different customers in addition to the normal burden of managing the trains themselves.

SUMMARY OF INVENTION

The principles of the present invention are embodied in computer-based systems and methods, which allow a railroad company and its customers to plan, schedule, and managing the transport of crude oil by rail. One particular embodiment is a combination hardware-software system for managing the transportation of crude oil by rail, which includes a user terminal having a display screen and a processing system coupled to the user terminal through a communications link. The processing system generates a user interface on the display screen of the user terminal for receiving input information from a user, including information indicating a loading facility for loading a selected set of railcars and an unloading facility for unloading the selected set of railcars. The processing system is further operable to forecast an arrival time for the set of cars at the loading facility and an arrival time for the set of cars at the unloading facility and display the forecasted arrival times at the loading and unloading facilities on the display screen of the user terminal.

In addition, various embodiments of the present principles also provide for the generation of graphs on a user terminal, which allow the user to quickly discern the forecasted operations of shipments on a particular lane, the forecasted operations of a particular set of cars, and tank levels at the loading and unloading facilities. Furthermore, a preferred set of algorithms, suitable for execution in software on the disclosed hardware-software system, is disclosed for forecasting arrival times at loading and unloading facilities, for identifying a best set option for providing a shipment to a particular facility on a particular date, as well as for determining the necessary number of shipments or sets required to meet a crude oil throughput goal.

BRIEF DESCRIPTION OF DRAWINGS

For a more complete understanding of the present invention, and the advantages thereof, reference is now made to the following descriptions taken in conjunction with the accompanying drawings, in which:

FIG. 4 is a diagram illustrating a representative or facilities parameters screen (page) presenting information generated by the server and displayed on a corresponding one of the end user terminals in the system of FIG. 1;

FIG. 6A is a diagram illustrating a representative set management display screen (page) presenting information generated by the server and displayed on a corresponding one of the end user terminals in the system of FIG. 1;

FIG. 6B is a diagram showing a particular example of a preferred procedure for calculating the best set option for delivering a particular shipment to a specific destination on a specific date using the screen shown in FIG. 6A;

FIG. 7A is a more detailed diagram of the graphical portion of the main display screen of FIG. 2 depicting an exemplary prediction of the tank level at a selected facility based on the forecasted train schedules calculated using the procedures of FIGS. 7B and 7C;

FIG. 7B is a flow chart illustrating a preferred procedure for estimating the hourly tank level at a loading facility; and FIG. 7C is a flow chart illustrating a preferred procedure of estimating the hourly tank level at an unloading facility.

DETAILED DESCRIPTION OF THE INVENTION

The principles of the present invention and their advantages are best understood by referring to the illustrated embodiment depicted in FIGS. 1-7 of the drawings, in which like numbers designate like parts. These principles will be described using a system for planning, scheduling, and managing the transport of crude oil by rail, although it should be recognized that they are generally applicable to the transport by rail of other types of products, as well.

Figure 1:
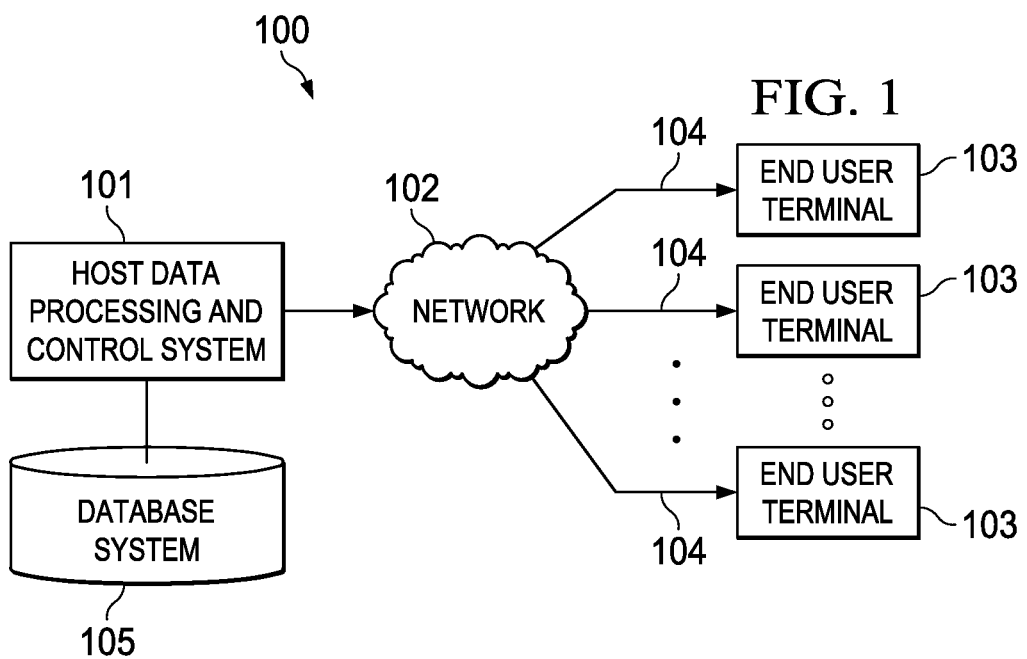
FIG. 1 is a high level functional block diagram illustrating a representative computer network operating environment in which the principles of the present invention can advantageously be applied.

FIG. 1 is a high-level conceptual block diagram of an exemplary network-based computer system 100 suitable for describing a typical application of the principles of the present invention. In the illustrated embodiment, system 100 is based on a host data processing and control system (server) 101 and a global network 102, such as the Internet. Global network 102 could also be a private, organizational, or governmental computer-based network known in the art, such as a wide area network (WAN) or local area network (LAN). The interconnections between the operational blocks shown in system 100 shown in FIG. 1 can be implemented by hardwired connections, wireless connections, or a combination of the two.

Generally, the application of the principles of the present invention is independent of the high-level architecture and high-level hardware-software implementation of system 100. System 100 allows a user (e.g., a railroad customer or railroad) to monitor and manage the shipment of crude oil by rail using an end user terminal 103, railroad host server 101 and associated database 105, communications interconnections 104, and network 102. End user terminals 103, may be, for example, a desk top computer, laptop computer, tablet, mobile phone, or similar conventional computing-communications device, which supports standard network interfacing through browsers or applications. In the typical operating environment, system 100 will have multiple users, including those employed by the railroad and those employed by the customer, and a corresponding number of end user terminals 103, although only three end user terminals 103, and a corresponding number of communications interconnections 104, are shown in FIG. 1 for reference.

The subsystems of system 100, including railroad host server 101, database 105, and communications interconnections 104 are preferably based on hardware and software systems known in the art, including computers, servers, processors, displays, and communications systems. Depending on the particular configuration of system 100 being employed, the base hardware and software can be, in whole or in part, localized (e.g., at a geographically centralized data center) or distributed (e.g., at multiple geographically-diverse processing nodes).

Figure 2:
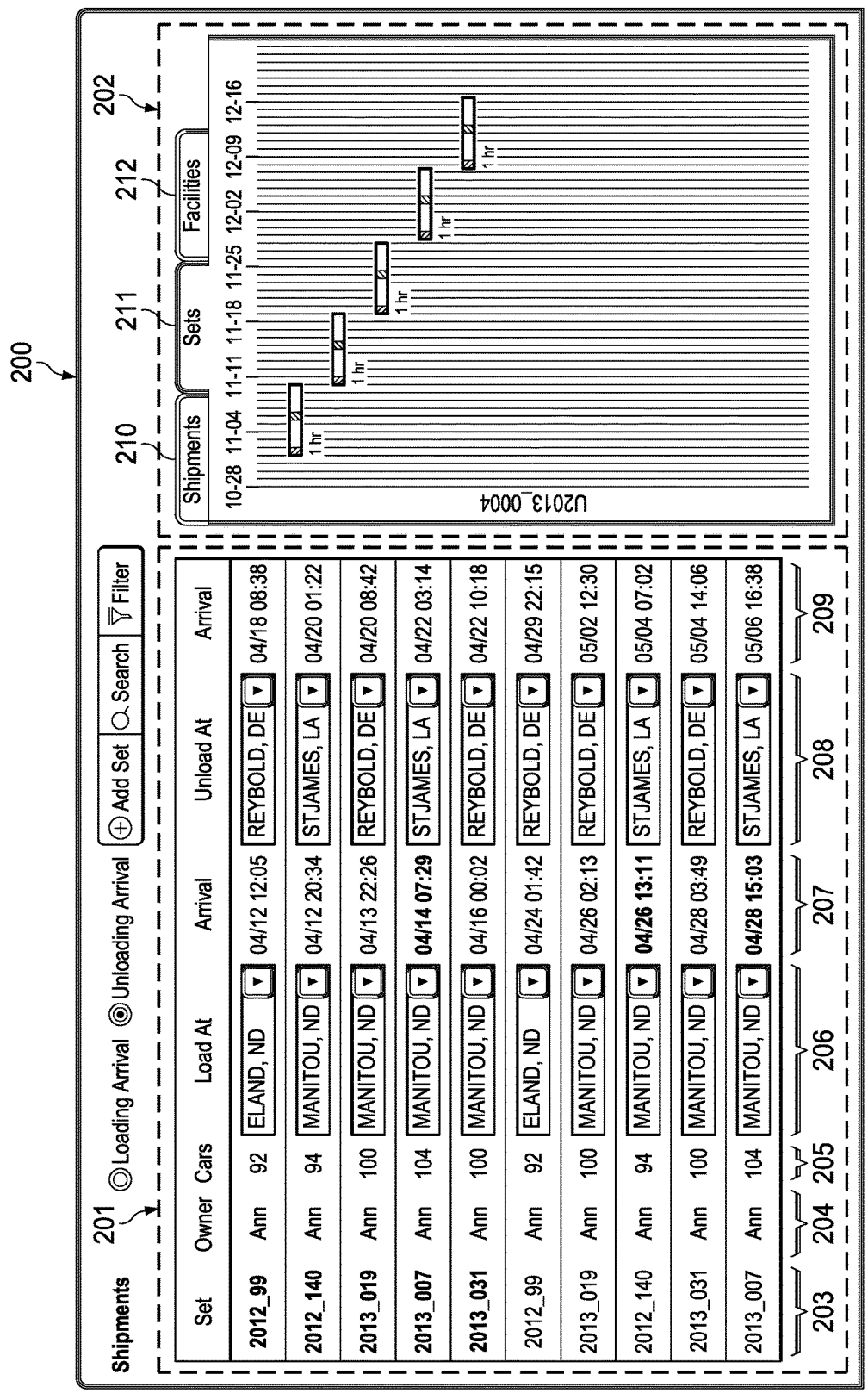
FIG. 2 is a diagram illustrating a representative main display screen (page) presenting information generated by the server and displayed on a corresponding one of the end user terminals in the system of FIG. 1.

FIG. 2 illustrates a representative main screen displayed on a given user terminal 103, according to the principles of the present invention. Generally, main screen 200 allows crude oil shipments to be assigned to sets of railcars allocated to a particular customer and then manages under dynamic circumstances. More particularly, main screen 200 includes a user interface section 201, which allows the user to edit the origin and destination points for shipments and review the resulting forecasted arrival times. User interface section, which is generated by software running on railroad host server 101 and the corresponding end user terminal 103, provided for the input and output of information to system 100. A graphical section 202 provides a graphical display allowing the user to graphically view operations based on shipment, railcar set, or facility. In the illustrated embodiment, the graphs shown in graphical section 202 are generated using commercially available software, such as Highcharts, running on either railroad host server 101, the corresponding user terminal 103, or both.

For purposes of the present discussion, a "shipment" is the delivery of crude to a destination, a "set" is a set of railcars making the shipment, and a "lane" is a specific combination of an origin (loading facility) and a destination (unloading facility). "Queuing time" is the time a set spends waiting to load and unload at a facility." "Dwell time" is the total time spent at a facility, which includes queuing time and loading/unloading time. "Online time" is the time spent on the railroad providing services through system 100. "Offline time" is the time spent on another railroad (i.e., a "foreign carrier").

In the illustrated embodiment, each shipment is identified by a set identifier 203, set owner 204, and the number of cars in the set 205. A window 206 allows the user to edit the facility at which the set will be loaded (e.g., the origin). In response, system 100 generates and displays a forecast arrival date and time 207 of the set at the loading facility. Similarly, a window 208 allows the user to edit facility at which the set will be unloaded (e.g., the destination), after which system 100 generates and displays a forecast arrival date and time 209 of the set at the unloading facilities. The data on user interface section 201 may be sorted by forecast loading arrival date and time 206 or forecast unloading arrival date and time 209. (In the example shown in FIG. 2, the displayed information is sorted by unloading arrival date and time 209).

Graphical section 202 is associated with a tab 211 for graphically displaying operational data by shipment, a tab 212 for graphically displaying operational data by set, and a tab 213 for graphically displaying operational data by facility. In FIG. 2, the user has selected tab 211 and the operational data is being displayed by set, in this case, the set with the set identifier U2013_0004. Graphical section 202 is described in further detail below.

Figure 3:
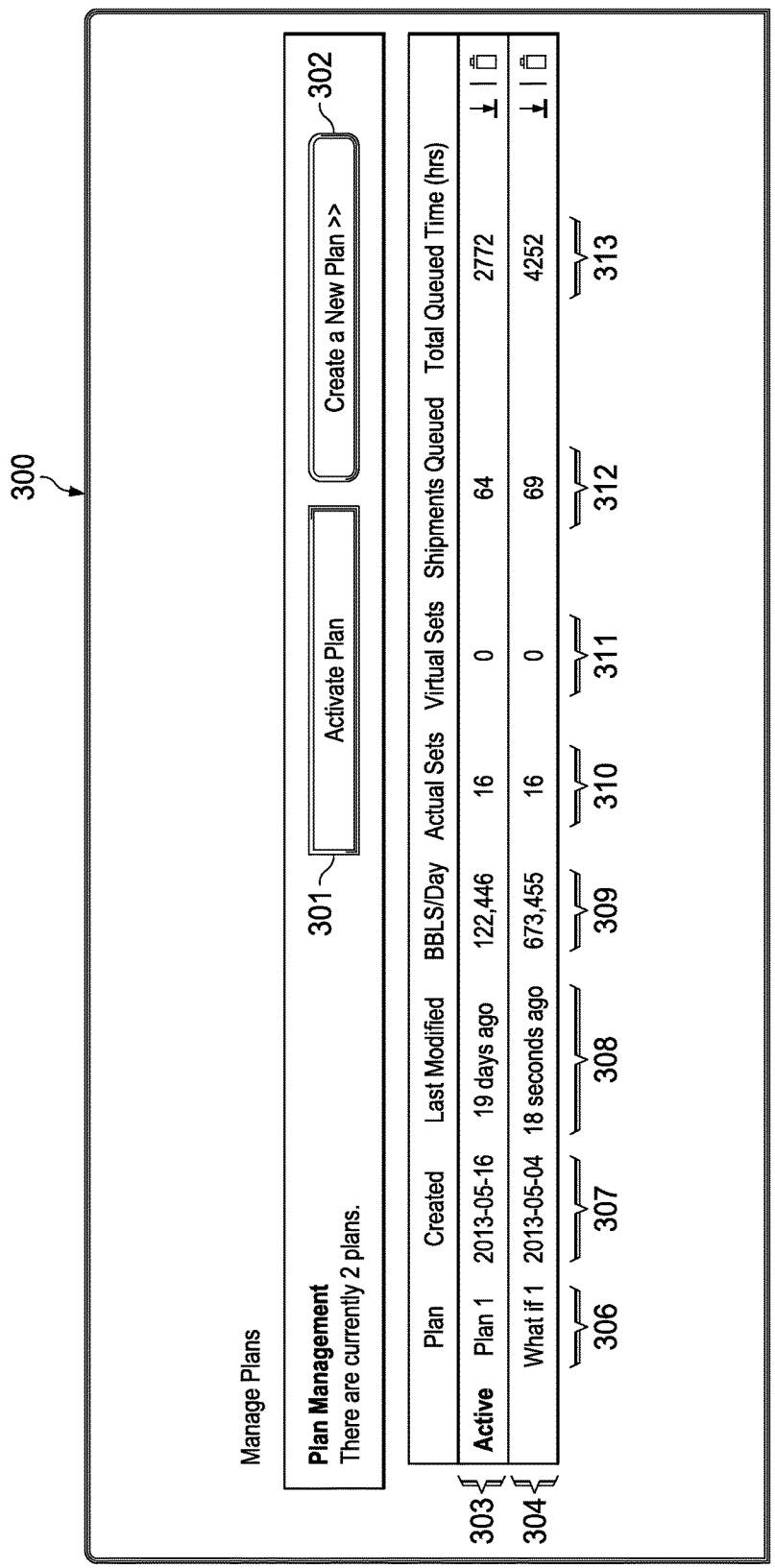
FIG. 3 is a diagram illustrating a representative plan management screen (page) presenting information generated by the server and displayed on a corresponding one of the end user terminals in the system of FIG. 1.

FIG. 3 depicts a representative plan management screen 300 generated by software running on system 100 (e.g. railroad host processor 101, the corresponding user terminal 103, or both) and displayed on a given end user terminal 103. Plan management screen 300 generally allows a user to create and erase planning scenarios, export created scenarios to an MS Excel file, or summarize shipments (e.g. by barrels per day) within a planning horizon. Scenarios can be either active scenarios, which are implemented, or "what-if" scenarios, which allows the user to forecast operations in response to varying parameters and conditions.

Plan management screen 300 includes a graphical button 301 for activating a created plan and a graphical button 302 for creating a new plan. Two plans are shown in FIG. 3, an active plan 303 and a "What if" plan 304. Each plan is characterized by parameters including a plan identifier 306, creation date 307, a last modification date 308, a forecast number of barrels per day (BBLS/day) 309, a forecast number of actual sets used 310, a forecast number of virtual sets 311, a forecast number of shipments queued 312, and the forecast total queuing time 313. A tool for forecasting the number of sets needed for a given throughput goal is discussed below in connection with FIG. 5G, while a tool for forecasting the number of shipments needed for a throughput goal is discussed below in connection with FIG. 5H. FIG. 6D illustrates a tool for determining the number of sets available to a particular customer, also discussed further below.

A representative facilities parameters screen 400 is shown in FIG. 4. Generally, this screen allows the user to edit facility parameters, such as the number of loading racks available, add or subtract the number of days per cycle time used for planning, and change the storage tank parameters (e.g., for calculating crude inflow).

As shown in FIG. 4, facilities parameters screen 400 may be used to vary the parameters or conditions at both loading facilities 401 and unloading facilities 402. These variables include dwell time 404, number of loading racks 405, barrels per car 406, and maximum cars per train 407. In addition, the user can also enter any blackout parameters 403 for those loading an unloading facilities. Blackouts can be characterized by facility 408, starting date 409, starting time 410, ending date 411, and ending time 412.

Figure 5A:
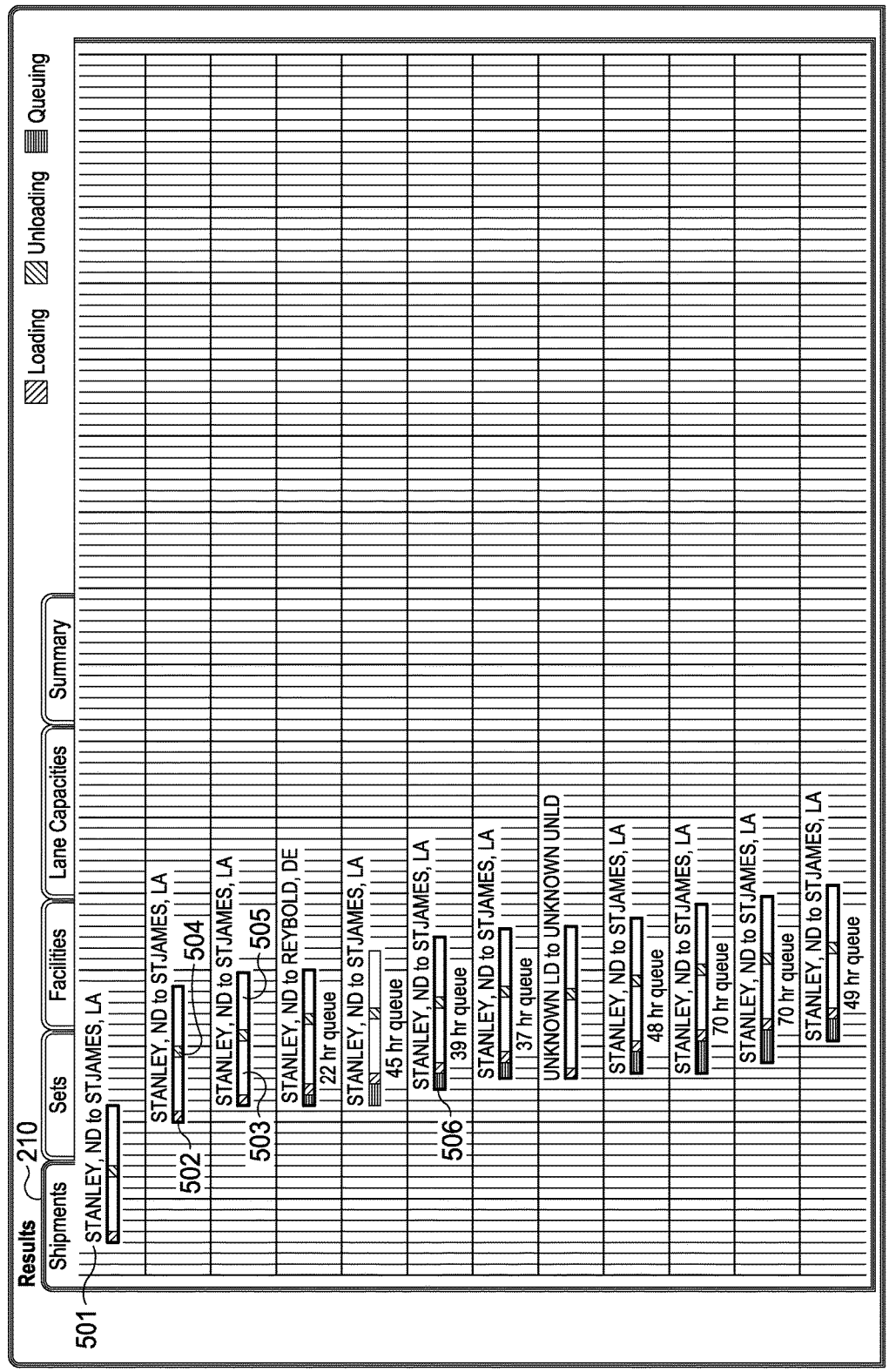
FIG. 5A is a more detailed diagram of the graphical portion of the main display screen of FIG. 2 showing a representative projected shipping operations, including queuing alerts and potential conflicts.

FIG. 5A is a detailed view of shipment operations graph pulled up in graphical section 202 of main screen 200 of FIG. 2 using shipments tab 211. In FIG. 5A, ten (10) shipments 501 between Stanley, N. Dak. and St James, La., are shown as an example. (A graph bar for one unidentified shipment is shown as a reference for discerning the overlap between graph bars in FIG. 5A).

Each shipment is graphically shown as a bar graph including the loading time at the origin 502, the transit time from the origin to the destination 503, the unloading time at the destination 504, and the return transit time from the destination to the origin 505. In the event a shipment is queued for loading at the origin, the queue time 505 is also graphically depicted. Advantageously, shipment tab 211 allows a user to quickly discern the forecasted operations on a particular lane, including potential bottlenecks (e.g., queuing times).

Figure 5B:
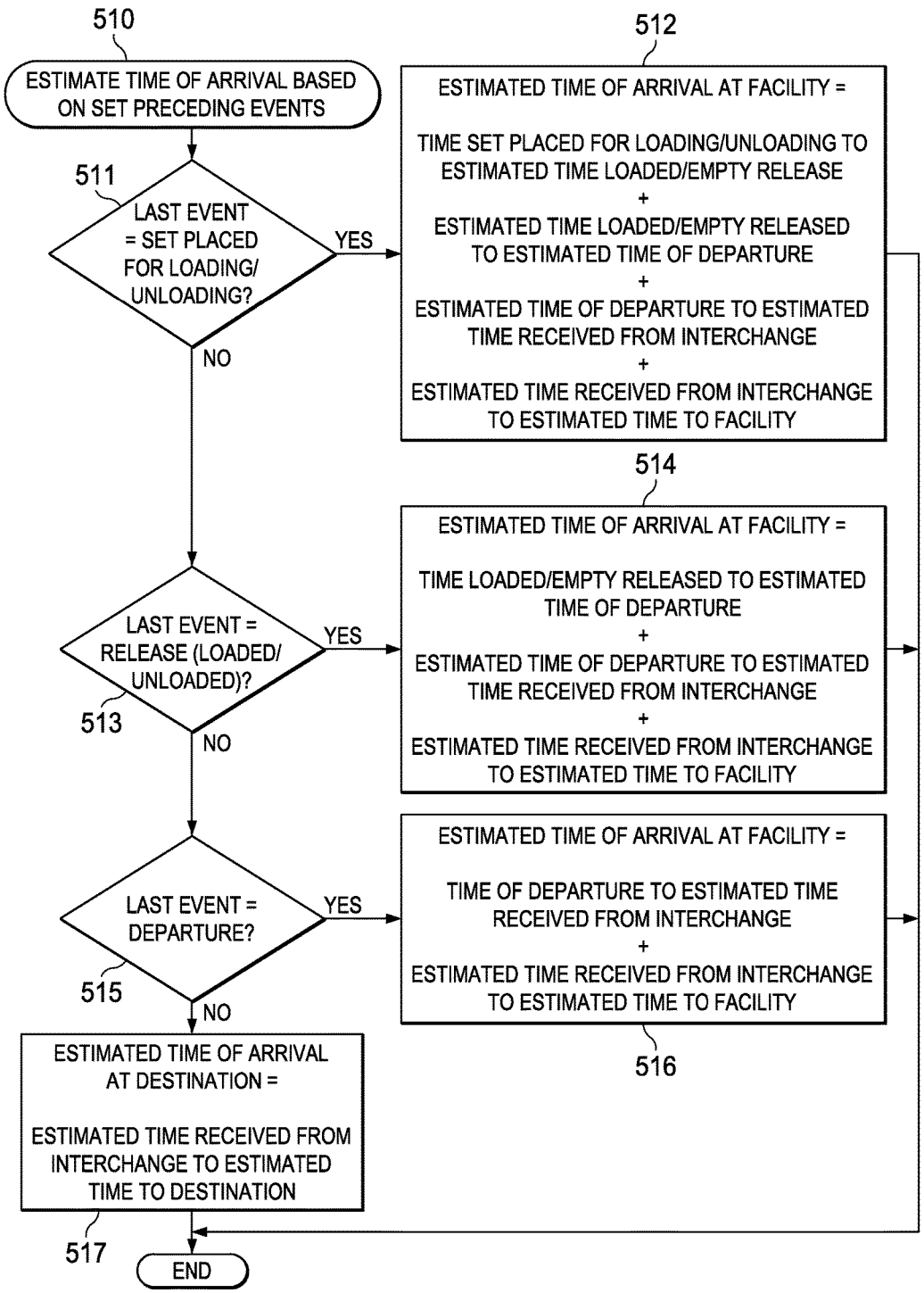
FIG. 5B is a flow diagram illustrating a representative procedure for estimating a time of arrival for an immediate next arrival at selected facility based on a preceding events for a set.
Figure 5C:
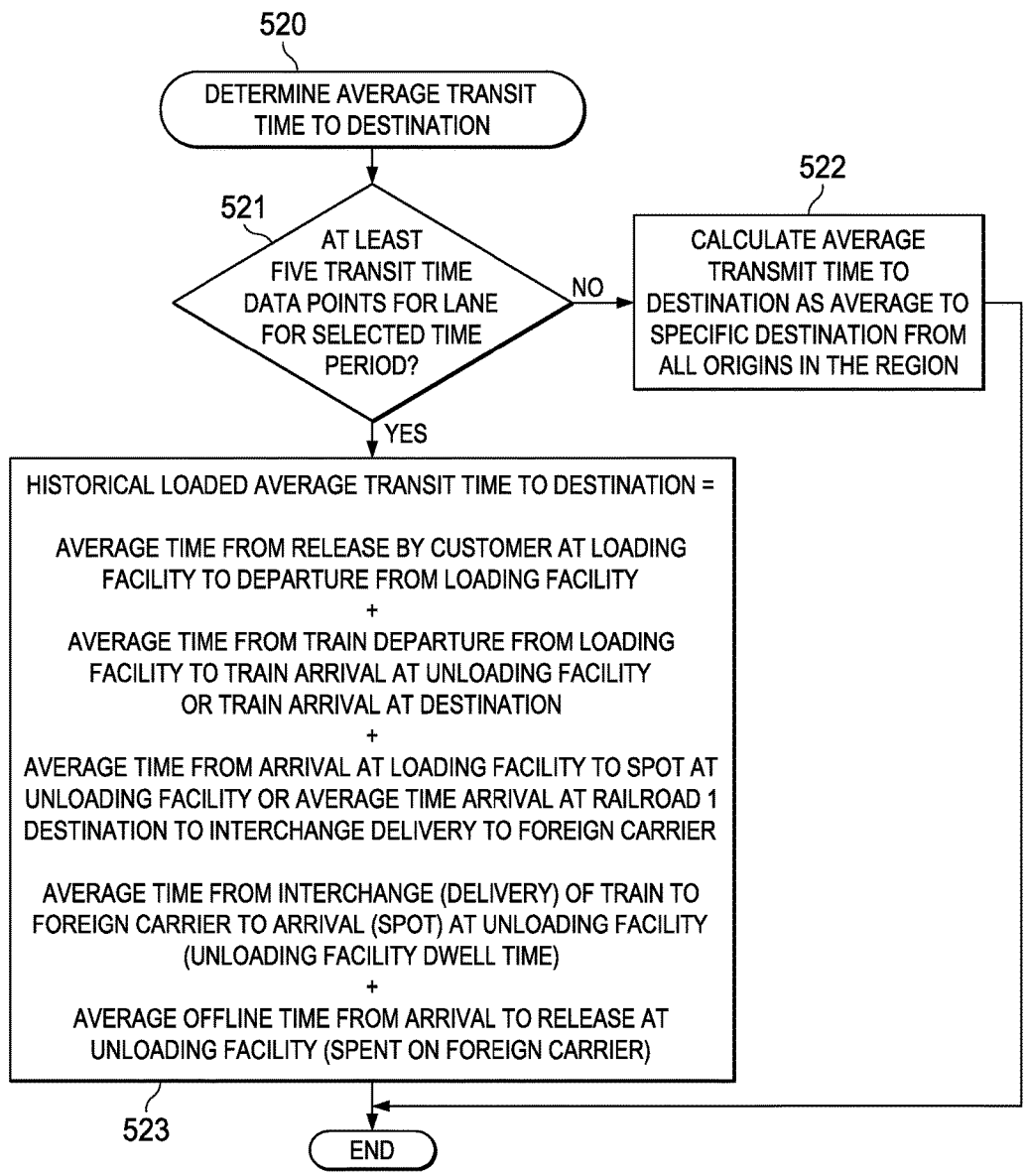
FIG. 5C is a flow diagram illustrating a representative procedure for estimating a transit time from an origin to a destination.

A preferred Procedure 510 for estimating the time of arrival for the immediate next arrival at a facility (either loading or unloading) based on a set of preceding events reported from the train and entered into system 100 is shown in FIG. 5B. Procedure 510, which is preferably executed in software running on railroad host server 101 and the given end user terminal 103, advantageously provides the higher degree of granularity needed for forecasting the immediate next arrival at a facility, in contrast to Procedures 520 and 530 discussed below, which are more generally applicable for forecasting arrival times at the loading and unloading facilities. Preferably, Procedures 520 and 530 are used for forecasting arrivals at a facility other than the immediate next arrival, which are generally more tolerant to a lesser degree of granularity. With regards to Procedures 510, 520, 530, it is being assumed that a foreign carrier is transferring a set into or out of the facility, although this is not always necessary for practicing these procedures, If the last reported event was the set placed for loading or unloading at the starting facility at Decision Block 511, the estimated time of arrival at the facility is calculated at Block 512 as:

Estimated Time of Arrival at Facility (*TA*)=Time Placed for Loading (*APPL*)/Unloading (*APPU*) to Estimated Time Loaded Release (*RIRL*)/Empty Release (*RIRE*) at Starting Facility+Estimated Time of Loaded/Empty Release to Estimated Time of Departure (*TD*) from Starting Facility+Estimated Time of Departure from Starting Facility to Estimated Time Received from Interchange (*RR*)+Estimated Time Received from Interchange to Estimated Time to Ending Facility If the last event taking place was the set released (loaded or unloaded) at Decision Block 513, then the estimated time of arrival at the destination is calculated at Block 514 as:

Estimated Time of Arrival at Facility=Time of Loaded/Empty Release at Starting Facility to Estimated Time of Departure from Starting Facility+Estimated Time of Departure from Starting Facility to Estimated Time Received from Interchange+Estimated Time Received from Interchange to Estimated Time to Ending Facility If the last event was departure, at Decision Block 515, then the estimated time of arrival at the destination is calculated at Block 516 as:

Estimated Time of Arrival at Ending Facility=Time of Departure from Starting Facility to Estimated Time Delivered for Interchange+Estimated Time Received from Interchange to Estimated Time to Ending Facility Finally, if at Decision Block 515 the last event was received from interchange (i.e., the last event was not departure), then at Block 517, then the estimated time of arrival at the destination is calculated as:

Estimated Time of Arrival at Ending Facility=Time Received from Interchange to Estimated Time to Ending Facility A preferred procedure 520 for calculating the average transit time to a particular destination is shown in FIG. 5C. Procedure 520 is preferably implemented in software executed on railroad host server 101 and/or the corresponding user terminal 103. At Decision Block 521 a determination is made as to whether at least five data points representing transit times for the given lane over a given time period are available. If these five data points are not available, then at Block 522 the average transit time to the particular destination is calculated as the average time to that destination from all origins within the geographical region.

On the other hand, if five data points representing transit times for the given lane are available, then at Block 523, the average transit time is calculated as the historical average transit time:

Historical Loaded Average Transit Time to Destination=Average Time From Release by the Customer at Loading Facility to Departure from Loading Facility (*ORIGAVE*)+Average Time from Train Departure from Loading Facility to Train Arrival at Unloading Facility or Train Arrival at Destination (*TDTAAVG*)+Average Time from Arrival at Unloading Facility to Spot at Unloading Facility or Average Time Arrival at Railroad 1 Destination to Interchange Delivery to Foreign Carrier (*DESTAVG*)+Average Time from Interchange Delivery of Train to Foreign Carrier to Spot Arrival at Unloading Facility (Average Unloading Dwell Time–*DDA*–

*P*AVG)+Average Offline Time from Arrival to
Release at Unloading Facility (Spent of Foreign
Carrier) (*OAPRI*AVG, *EAPRI*AVG)+

Figure 5D:
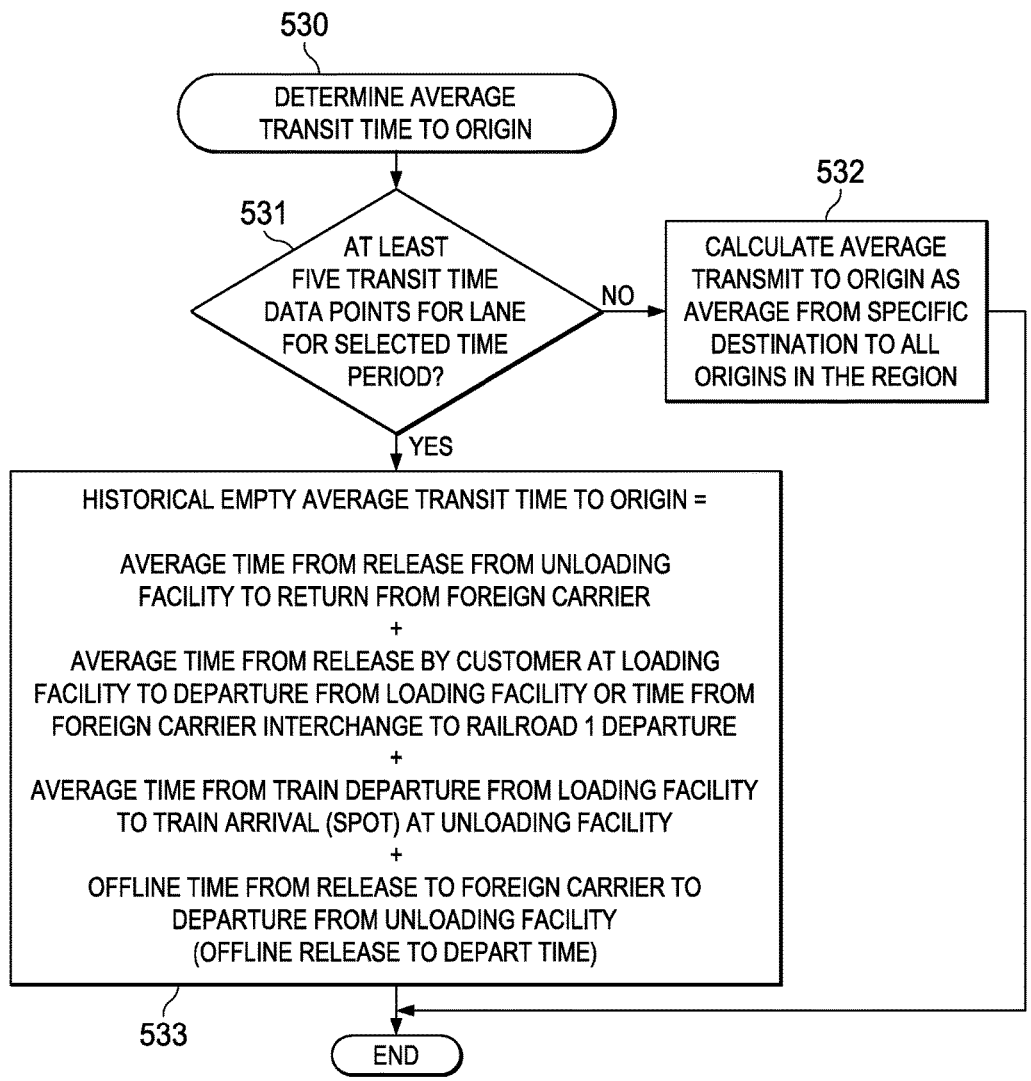
FIG. 5D is a flow diagram illustrating a representative procedure for estimating a transit time from the destination back to the origin.

A preferred Procedure 530 for determining the average transit time to the origin is shown in FIG. 5D. Procedure 530 is preferably implemented in software executed on railroad host server 101 and/or the corresponding user terminal 103. At Decision Block 531, a determination is made as to whether at least five data points representing transit times for the given lane over a given time period are available. If these five data points are not available, then at Block 532 the average transit time to the particular origin is calculated as the average time to that origin from all destinations within the geographical region.

Otherwise, if five data points representing transit times for the given lane are available, then at Block 533, the average transit time is calculated as the historical average transit time:

Historical Empty Average Transit Time to
Origin=Average Time from Release from
Unloading Facility to Return from Foreign Carrier (*RIRR*AVG)+Average Time From Release
by the Customer at Unloading Facility to
Departure from Unloading Facility or Average
Time From Foreign Carrier Interchange to Railroad 1 Departure (*ORIG*AVE)+Average Time
from Train Departure from Unloading Facility
to Spot Train Arrival at Loading Facility (*TD-TA*AVG)+Offline Time from Release to Foreign
Carrier to Departure from Unloading Facility
(Offline Release to Depart Time) (*ORITD*AVG)

In some embodiments, the user may adjust the average transit time (either loaded or empty) from the historical average time to account for known delays or conflicts in a lane or to execute a "what if" scenario. Transit time adjustments are made using a window in a manner similar to the parameter adjustments made using the parameter display of FIG. 4. The user is limited to increasing the transit time above the historical average and cannot decrease the transit time to below the historical average.

Figure 5E:
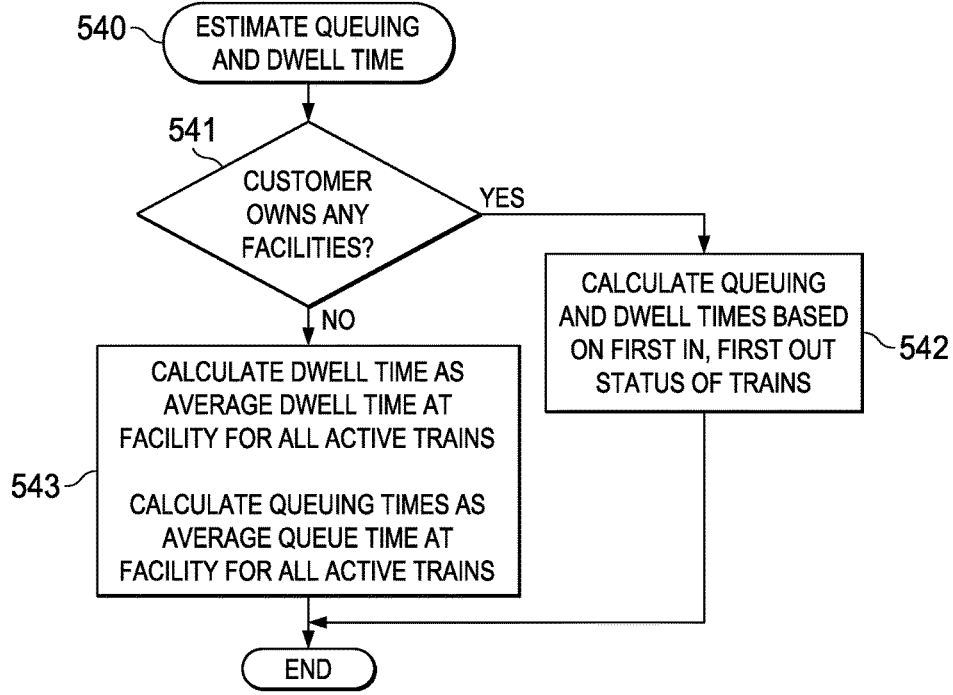
FIG. 5E is a flow diagram illustrating a representative procedure for estimating queuing and dwell time at a loading/unloading facility.

FIG. 5E illustrates a preferred Procedure 540 for estimating queuing and dwell time at a facility. In the preferred embodiment, Procedure 540 is implemented in software executed on railroad host server 101 and/or the corresponding user terminal 103. At Decision Block 541, a determination is made as to whether the customer owns any facilities. If so, then the queuing and dwell times are calculated based on the first-in, first-out status of the trains (Block 542). Otherwise, at Block 543, the dwell time is calculated as the average dwell at the facility for all active trains and the queuing time is calculated as the average queue time at the facility for all active trains. Advantageously, the queuing time estimate allows the owner of a facility to observe the order of trains arriving at their facility, a feature which is typically not required for non-facility owners.

Figure 5F:
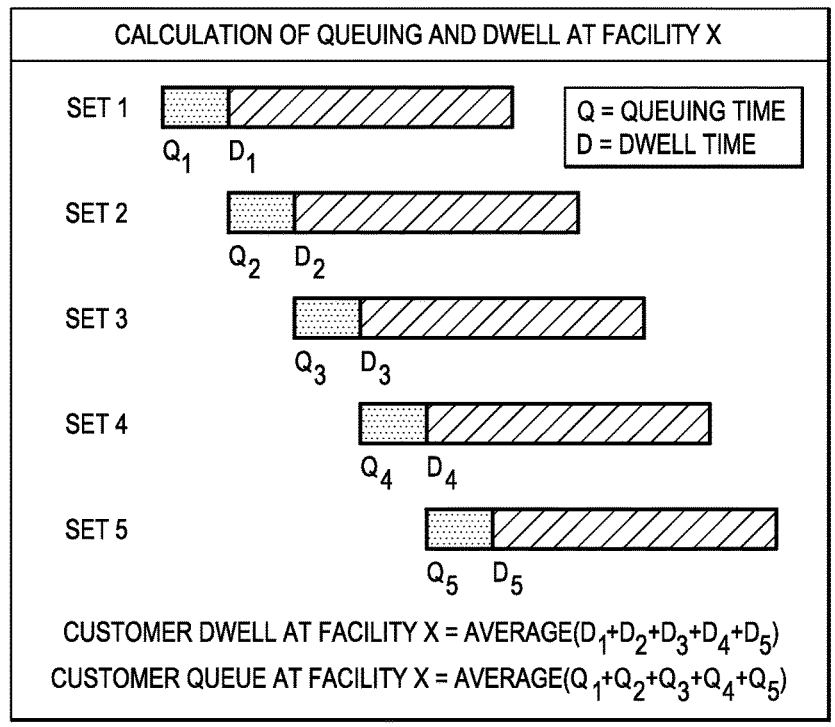
FIG. 5F is a diagram illustrating the relationship between car sets during queuing and dwelling at a loading/unloading facility.

FIG. 5F illustrates an example of the operation at Block 543 for a customer does not own or operate the facility but does have five sets subscribed to that facility.

Figures 5G, 5H:
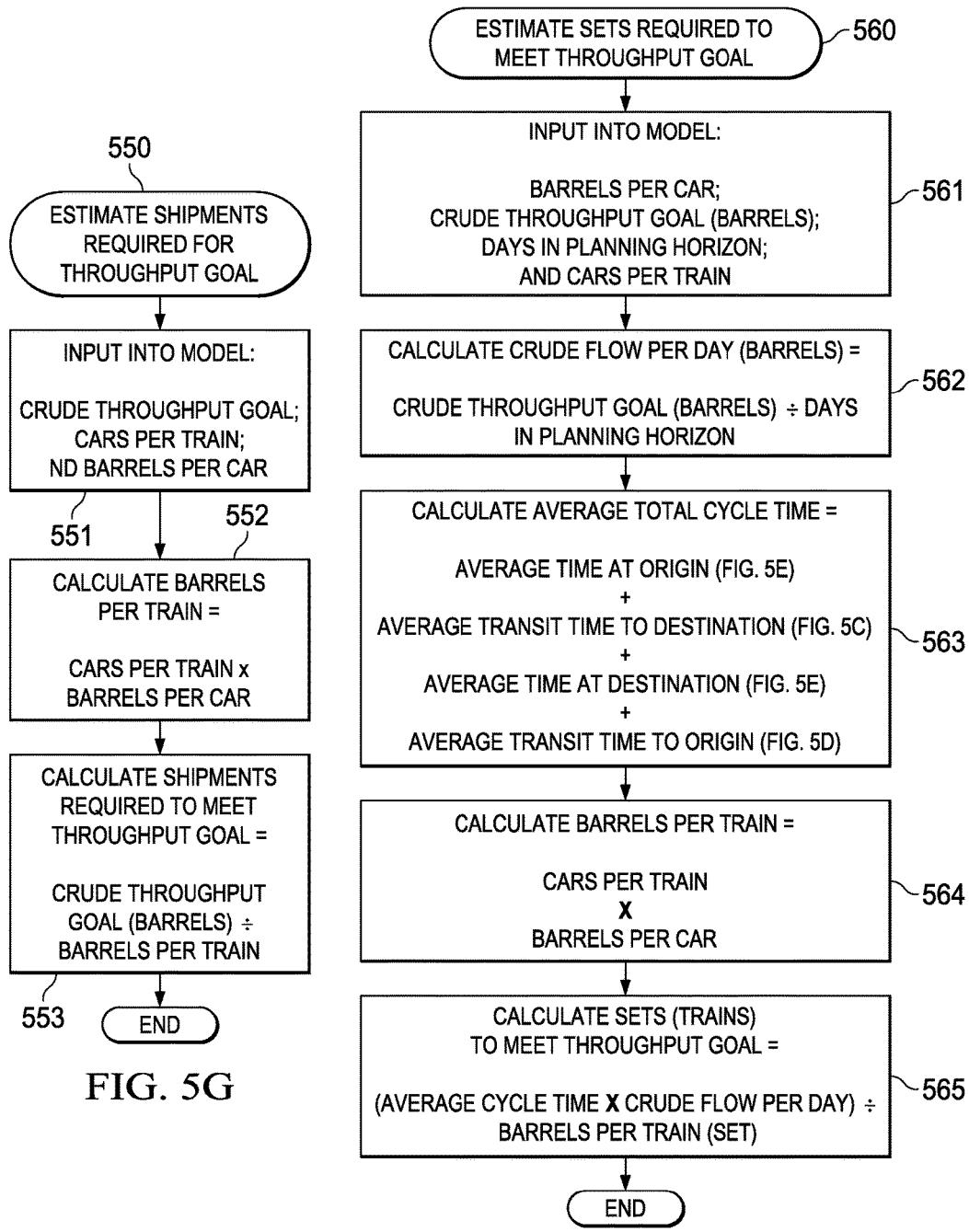
FIG. 5G is a flow diagram illustrating a representative procedure for estimating the number of shipments required to meet a throughput goal.
FIG. 5H is a flow diagram illustrating a representative procedure for estimating the number of car sets required to meet a throughput goal.

Procedure 550, shown in FIG. 5G, is a preferred method for estimating the number of shipments required to meet a throughput goal. Procedure 550 is preferably implemented in software executed on railroad host server 101 and/or the corresponding user terminal 103. At Block 551, the crude throughput goal, number of cars per train, and barrels per car are input into the model. The number of barrels per train is calculated at Block 552 as the product of the number of cars per train and the number of barrels per car. The number of shipments required to meet the throughput goal is calculated at Block 553 by dividing the crude throughput goal, in barrels, by the number of barrels per train.

A Procedure 560 for estimating the number of sets required to meet a throughput goal is shown in FIG. 5H. Preferably, Procedure 520 of FIG. 5C (i.e., determining the average transit time to the destination), Procedure 530 of FIG. 5D (i.e., determining the average transit time to the origin), and Procedure 540 of FIG. 5E (i.e., estimating the average queuing and dwell time at a facility) are used to implement Procedure 560, although this is not a strict requirement. Procedure 560 is also preferably implemented in software executed on railroad host server 101 and/or the corresponding user terminal 103.

At Block 561, the number barrels per car, the crude throughput goal, the number of days in the planning horizon, and number of cars per train are input into the model. The crude flow per day is calculated at Block 562 as:

Crude Flow Per Day (Barrels)=Crude throughput
GOAL (Barrels)÷Number of Days in Planning
Horizon The average total cycle time is then calculated at Block 563 as:

Average Total Cycle Time=Average Time at Origin+
Average Transit Time To Destination+Average
Time at Destination+Average Transit Time to
Origin At Block 564, the number of barrels per train is calculated as:

Barrels per Train=Number of Cars Per Train×Number of Barrels Per Car

The number of sets (trains) required to meet the throughput goal is calculated at Block 565 as:

Number of Sets to Meet Throughput Goal=(Average
Cycle Time×Crude Flow Per Day)÷Number of
Barrels Per Set FIGS. 6A and 6B illustrate the use of main screen 200 to identify the sets that can be made available to a customer to provide a shipment to a given facility on a given date. Generally, the user brings up a search pane 601 using a graphical button or similar interface, as shown in FIG. 6A. In the illustrated embodiment, the user uses a window 602 to select a facility and a window 603 to select a target date. System 100 then provides options ("theoretical lines") for achieving the desired shipment by editing the current scheduling of one or more sets. The process shown in FIGS. 6A and 6B are preferably implemented in software executed on railroad host server 101 and/or the corresponding user terminal 103.

FIG. 6B illustrates a particular example where the customer wishes to deliver a shipment of crude to Hayti, Mo. with an unloading arrival of April 21. For each of the scheduled shipments shown in the user interface portion 201 of main screen 200, system 100 calculates an estimated time (ETA) of arrival at Hayti based on the ETA to each currently scheduled loading facility 207 and the cycle time to Hayti (e.g., a theoretical lane). For example, set 2012_99 is scheduled to arrive at Eland, N. Dak. on April 4 for loading. After adding the cycle time to Hayti, Mo., to the loading date of April 4 system 100 calculates an ETA of April 18 for the theoretical lane from Eland to Hayti, as shown in option #1 in conceptual box 641 of FIG. 6B (box 641 is preferably not part of the actual display).

System 100 highlights the best theoretical lane, which provides an arrival date that is either on the target date or is the closest arrival date before the target date. In this example, set 013_007 on entry line 640 from Manitou to Hayti, provides the closest ETA of April 20. The user can then decide to change the destination of set 2013_007 from St. James, La., to Hayti, Mo. to achieve the desired goal.

Figure 6C:
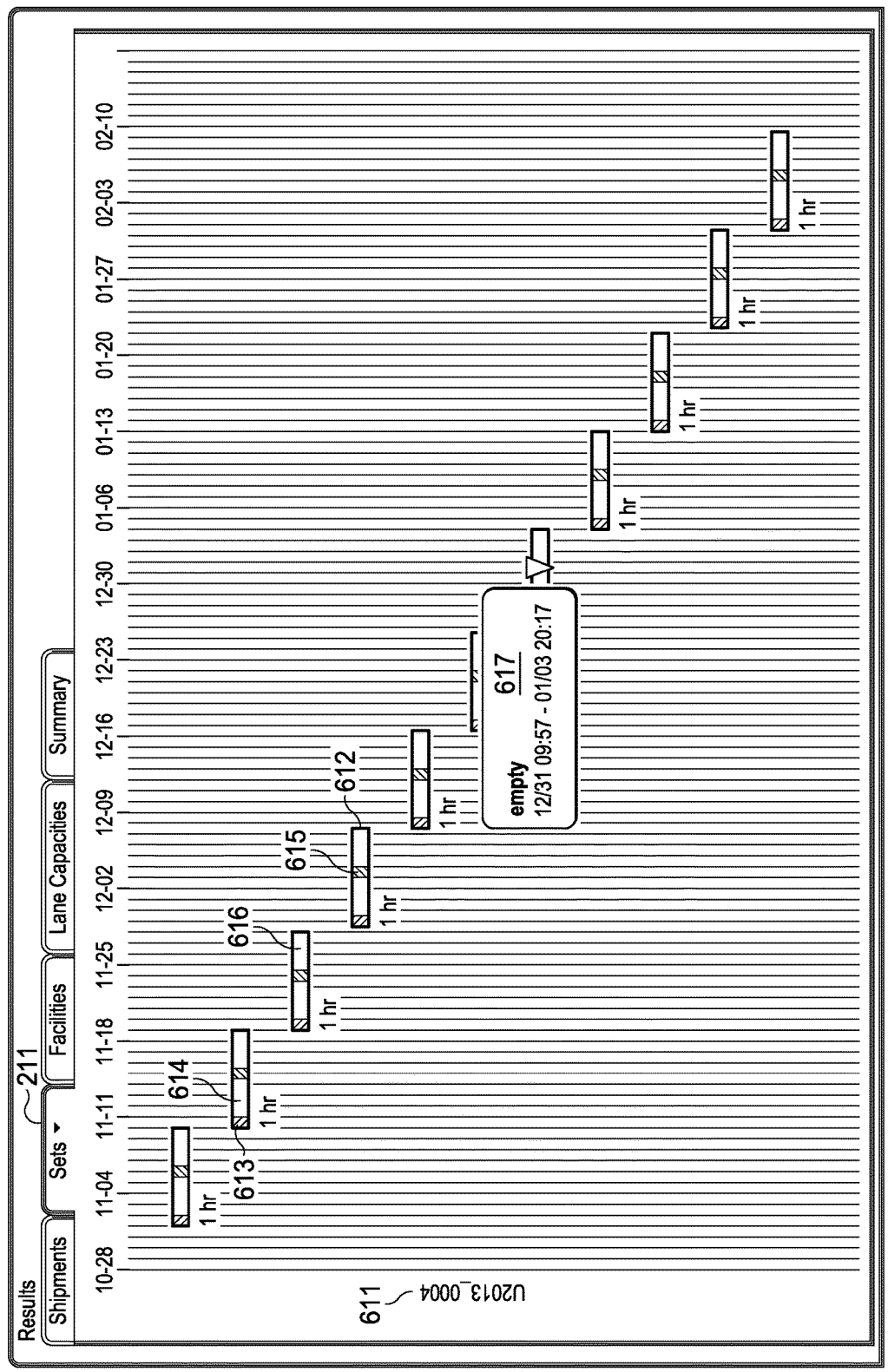
FIG. 6C is a more detailed diagram of the graphical portion of the main display screen of FIG. 2 depicting representative operations of a selected set.
Figure 6D:
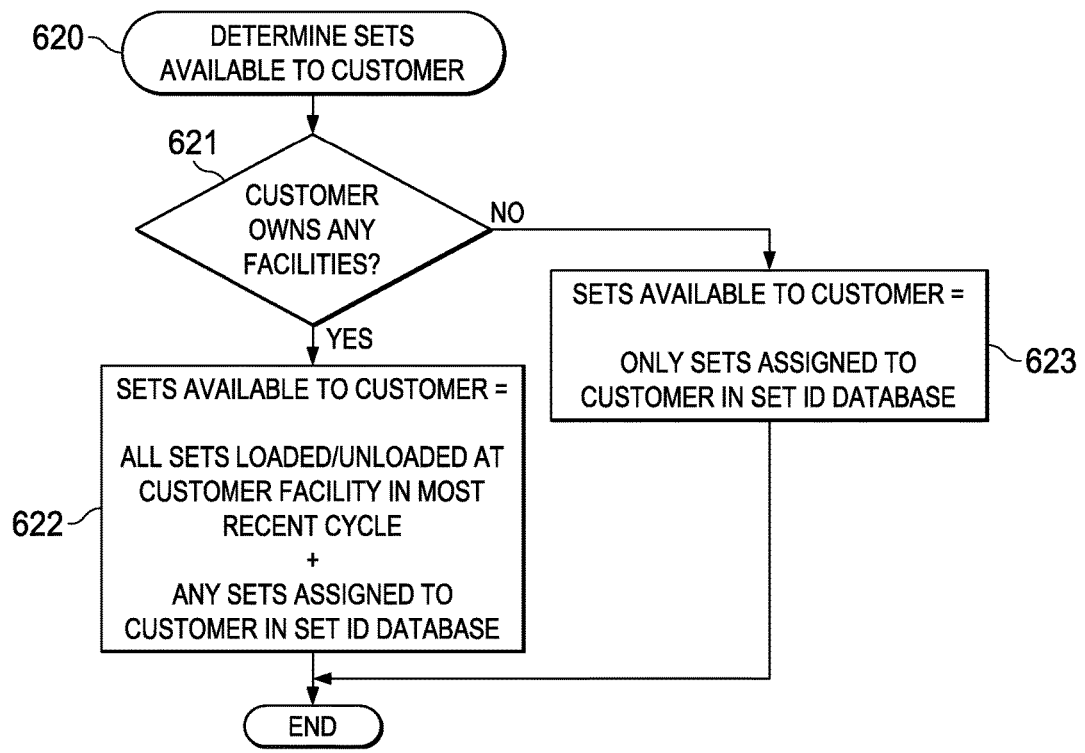
FIG. 6D is a flow chart depicting a preferred procedure for determining the sets available to a particular customer.

FIG. 6C illustrates a typical graphical representation of the operation of a set under sets tab 211 of graphical section 202 of main screen 200 of FIG. 2. In the illustrated embodiment, shipments are grouped by set I.D. 611, in this case, set U2013_0004. Each shipment is represented in time by a bar 612, which shows the loading time 613, the transit time to the destination 614, the unloading time 615, and the return transit time to the origin 616. By hovering over a particular shipment, a screen bubble 617 appears, which provides more particular details about the shipment, in this example, the empty time for the set.

A preferred Procedure 620, which is preferably implemented in software running on railroad host processor 101 and/or the corresponding user terminal 103, for determining those sets available to a particular customer is shown in FIG. 6D. At Decision Block 621, a determination is made as to whether the customer owns any facilities. If so, then at Block 621 the sets available, by set I.D. are:

> Sets Available to Customer=All Sets Loaded or Unloaded At Customer Facility In Most Recent Cycle+Any Sets Assigned to Customer in Set ID Database If the customer does not own any facilities at Decision Block 621, then the sets available to the customer are only those sets assigned to the customer in the set I.D. database (Block 623). Advantageously, the owner of a facility, which may have multiple railroads servicing a facility, can see all sets going into and out of a facility, whether or not the facility name is on the waybill.

FIG. 7A is a graphical representation of the predicted tank level at a particular customer facility, as displayed under facilities tab 212 for graphics section 202 of main screen 200. FIGS. 7B and 7C illustrate preferred procedures for generating the display shown in FIG. 7A based on forecasted train schedules.

Specifically, Procedure 700 shown in FIG. 7A calculates the estimated hourly tank level at a loading facility and is preferably implemented in software running on railroad host processor 101 and/or the corresponding user terminal 103. At Block 701, the inputs to the model include the hourly crude inflow by truck, hourly crude inflow by pipe, and the current tank level. The model estimates the hourly outflow by rail based on the forecasted train (set) cycles. The hourly crude inflow is then calculated at Block 702 as:

> Hourly Crude Inflow=Hourly Crude Inflow by Truck+Hourly Crude Inflow by Pipe

The hourly tank level at the loading facility is then calculated at Block 703:

> Hourly Tank Level at Loading Facility=(Currently Tank Level+Hourly Crude Inflow)−Hourly Crude Outflow by Rail FIG. 7B illustrates a preferred Procedure 710 for estimating the hourly tank level at an unloading facility. Procedure 700 is also preferably implemented in software running on railroad host processor 101 and/or the corresponding user terminal 103 At Block 711, the inputs to the model include the hourly crude outflow by truck, hourly crude outflow by pipe, and the current tank level. The model estimates the hourly outflow by rail based on the forecasted train (set) cycles. The hourly crude inflow is then calculated at Block 712 as:

> Hourly Crude Outflow=Hourly Crude Outflow by Truck+Hourly Crude Outflow by Pipe The hourly tank level at the unloading facility is then calculated at Block 713:

> Hourly Tank Level at Unloading Facility=(Current Tank Level+Crude Outflow by Rail)−Hourly Crude Outflow by Rail Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A system for managing the transportation of crude oil by rail, comprising:
    a plurality of user terminals each including a display screen for presenting a graphical user interface and output information, the graphical user interface including a user interface section having a loading facility arrival time field for presenting a forecast arrival time of a set of railcars at a loading facility, an unloading facility arrival time field for presenting a forecast arrival time of the set of railcars at an unloading facility, a loading facility selection window responsive to user input for selecting a loading facility for the set of railcars, and an unloading facility selection window responsive to user input for selecting an unloading facility for the set of railcars;
    a network communicating with the plurality of user terminals; and
    a processing system communicating with the plurality of user terminals and operable to:
        receive information entered through the loading facility selection window of the graphical user interface of a selected one of the plurality of user terminals indicating a loading facility for loading a selected set of railcars and through the unloading facility selection window of the graphical user interface indicating an unloading facility for unloading the selected set of railcars;
        dynamically forecast an arrival time for the selected set of cars at a selected one of the loading and unloading facilities selected through a corresponding one of the loading facility and unloading facility selection windows of the graphical user of the selected one of the plurality of user terminals, the arrival time dynamically forecast in response to events reported from a train including the set of cars to the processing system during transit of the selected set of railcars between a starting one of the loading and unloading facilities to the selected one of the loading and unloading facilities; and
        presenting the dynamically forecasted arrival time in a corresponding one of the loading facility and unloading facility arrival time fields of the graphical user interface on the display screen of the selected user terminal as updated in response to the reported events.

2. The system of claim 1, wherein the processing system is further operable to:
forecast a loading time at the loading facility;
forecast a transit time from the loading facility to the unloading facility;
forecast an unloading time at the unloading facility;
forecast a transit time from the unloading to the loading facility; and
display the forecasted loading, unloading, and transit times as a graph on the display screen of the selected terminal.

3. The system of claim 2, wherein the processing system displays the forecasted loading, unloading, and transit times on the display of the selected user terminal as a graph showing forecasted loading, unloading, and transit times for a plurality of sets carrying shipments between the loading facility and the unloading facility.

4. The system of claim 2, wherein the processing system displays the forecasted loading, unloading, and transit times on the display of the selected user terminal as a graph showing a plurality forecasted loading and unloading times and transit times for shipments being made by the selected set of railcars.

5. The system of claim 2, wherein the processing system is further operable to:
forecast a queuing time for at least one of the loading and unloading facilities; and
display the forecasted queuing time on the graph on the display screen in conjunction with the forecasted loading, unloading, and the forecasted transit times.

6. The system of claim 1, wherein the processing system is operable to dynamically forecast the arrival time for the set of railcars at the selected one of the loading and unloading facilities by executing the algorithm:
determining from information received by the processing system from at least one of the plurality of user terminals a last reported event for the set in travelling from the starting facility to the selected facility;
if the last reported event was the placed for loading/unloading at the starting facility, forecasting the arrival time at the selected facility from the sum of:
(a) a time period from the time the set was placed for loading/unloading at the starting facility to an estimated time of set loaded/unloaded release from the starting facility;
(b) a time period from the estimated time of set loaded/unloaded release from the starting facility to an estimated time of set departure from the another facility;
(c) a time period from the estimated time of the set departure from the starting facility to an estimated time the set is received from interchange; and
(d) a time period from the estimated time the set received from interchange to an estimated time to set arrival at the selected facility;
if the last event was set loaded/unloaded release from the starting facility, forecasting the arrival time at the selected facility from the sum of:
(a) the time period from the time of set loaded/unloaded release to the estimated time of the set departure;
(b) the time period between the estimated time of the set departure to the estimated time the set is received from interchange; and
(c) the time period between the estimated time the set is received from interchange to the estimated time to the set arrival at selected facility;
if the last event was set departure from the starting facility, forecasting the arrival time at the selected facility from the sum of:
(a) the time period between the time of the set departure from the starting facility to the estimated time set received from interchange; and
(b) the time period between the estimated time the set is received from interchange to estimated time to the set arrival at selected facility; and
if the last event was the set received from interchange, forecasting the arrival time as the estimated time to the set arrival at selected facility.

7. The system of claim 1, wherein the processing system is further operable to forecast the arrival time of the set of rail cars at the unloading facility by executing the algorithm:
determining if a minimum number of data points for transit times from the loading facility to the unloading facility are stored in memory;
if the minimum number of data points are not stored in memory, calculating an average set transit time from the loading facility to the unloading facility as an average transit time to the unloading facility from a selected number of loading facilities within a selected geographical region; and
if the minimum number of data points are stored in memory, calculating the average transit time from the loading facility to the unloading facility as the sum of:
(a) an average time between set release at the loading facility to set departure from the loading facility;
(b) an average time between set departure from the unloading facility to set arrival at a selected one of the unloading facility and a destination;
(c) a selected one of an average time from arrival at loading facility to spot at unloading facility and an average time from arrival at destination to interchange delivery to a foreign carrier;
(d) an average time between from set delivery for interchange with the foreign carrier to set spot arrival at the unloading facility; and
(e) an average offline time between set arrival to set release at the unloading facility spent on the foreign carrier.

8. The system of claim 1, wherein the processing system is further operable to forecast the arrival time at the loading facility by executing the algorithm:
determining if a minimum number of data points for transit times from the unloading facility to the loading facility are stored in memory;
if the minimum number of data points are not stored in memory, calculating an average transit time to the loading facility from the starting facility as an average transit time to the loading facility from a selected number of unloading facilities within a selected geographical region; and
if the minimum number of data points are stored in memory, calculating the average transit time from the unloading facility to the loading facility as the sum of:
(a) an average time from release from unloading facility to return from foreign carrier;
(b) a selected one of an average time from release from unloading facility to a selected one of a departure from the unloading facility and an average t me from interchange from the foreign carrier;

(c) an average time from set departure from the unloading facility to set arrival at the unloading facility; and
(d) an average offline time from set release to foreign carrier to set departure from unloading facility.

9. The system of claim 2, wherein the processing system is further operable to forecast queuing and dwell times for a selected one of the loading and unloading facilities by executing the algorithm of:
  determining from information stored in a database whether a customer owns a facility;
  in response to a determination that the customer owns a facility, estimating queuing and dwell times based on first-in, first-out status;
  in response to a determination that the customer does not own a facility, estimating the dwell time as the average dwell time at the facility for all active trains and estimating the queuing time as the average queuing time at the facility for all trains.

10. The system of claim 1, wherein processing system is further operable to:
  receive from the graphical user interface of the selected user terminal information representing a crude oil throughput goal, a number of cars per set, and a number of barrels per car;
  estimate a number of shipments required to meet a throughput goal by:
    calculating the number of barrels per train as the product of the number of cars per set and the number of barrels per car; and
    calculating the number of shipments required to meet the throughput goal by dividing the crude throughput goal by the number of barrels per train; and
    displaying the number of shipments required to meet the throughput goal.

11. The system of claim 1, wherein the processing system is further operable to:
  receive through the graphical user interface of the selected user terminal information representing a crude throughput goal, a number of barrels per car, a number of cars per set, and a number of days in a planning horizon;
  estimate a number of sets required to meet the crude throughput goal by: calculating a crude flow per day by dividing the crude throughput goal by a number of days in the planning horizon;
  calculating an average total cycle time as the sum of:
    (a) an average time at a loading facility;
    (b) an average transit time from the loading facility to an unloading facility;
    (c) an average time at the unloading facility; and
    (d) an average transit time from the unloading facility to the loading facility; and
  calculating a number of barrels per set as a product of the number of cars per set and the number of barrels per car; and
  calculating the number of sets required to meet the throughput goal by taking a product of the average cycle time and the crude flow per day and dividing the result by the number of barrels per set.

12. The system of claim 1, wherein the processing system is further operable to determine a number of sets available to a customer by executing the algorithm:
  determining if a customer owns a facility;
  in response to a determination that the customer owns a facility, calculating the sets available to the customer as the sum of a number of sets loaded or unloaded at the customer facility in a most recent cycle and a number of sets assigned to the customer in a database.

13. The system of claim 1, wherein the processing system is further operable to:
  store in a database a plurality of shipment schedules for shipping crude between at least one loading facility and at least one unloading facility, each schedule corresponding to a set and including estimated arrival time for the set at a corresponding loading facility and an estimated arrival time for the set at a corresponding current unloading facility;
  receive through the graphical user interface of at least one of the plurality of user terminals information representing a new shipment to a particular unloading facility for arrival on a particular date;
  for each loading facility, calculating a theoretical arrival time to the particular unloading facility; and
  display on the display screen of the selected user terminal a selected one of the sets as a best option for shipping crude from the corresponding loading facility to the particular unloading facility in lieu of the corresponding current unloading facility.

14. The system of claim 13, wherein the processing system selects the selected one of the sets as a best option for shipping crude to the particular unloading facility as the set having a theoretical arrival time closest to the particular arrival time.

15. The system of claim 13, wherein the processing system selects the selected one of the sets as a best option for shipping crude to the particular unloading facility as the set having a theoretical arrival time closest to the particular arrival time and is on or before the particular arrival time.

16. The system of claim 1, wherein the processing system is further operable to:
  receive information from at least one of the plurality of user terminals representing an inflow of crude to the loading facility and a current tank level at the loading facility;
  calculate an hourly tank level at the loading facility as the sum of the current tank level and the crude inflow rate minus an crude outflow rate by rail; and
  graphically display the hourly tank level at the loading facility on the display screen of the selected user terminal.

17. The system of claim 1, wherein the processing system is further operable to:
  receive information from at least one of the plurality of user terminals representing an outflow of crude from the unloading facility and a current tank level at the unloading facility;
  calculate a tank level at the unloading facility as the sum of the current tank level and the crude inflow rate by rail minus a crude outflow rate; and
  graphically display the tank level at the loading facility on the display screen of the selected user terminal.

18. A method of managing the transportation of crude oil by rail using an electronic data processing system including a plurality of user terminals and a server communicating with the plurality of end user terminals across a network, each user terminal including a graphical user interface having a user interface section with a loading facility arrival time field for presenting a forecast arrival time of a set of railcars at a loading facility, an unloading facility arrival time field for presenting a forecast arrival time of the set of railcars at an unloading facility, a loading facility selection window responsive to user input for selecting a loading facility for the set of railcars, and an unloading facility selection window responsive to user input for selecting an unloading facility for the set of railcars; comprising:

receiving from a user through the loading facility selection window of the graphical user interface of a selected one of the plurality of user terminals information indicating a loading facility for loading a selected set of railcars and through the unloading facility selection window of the graphical user interface of the selected one of the plurality of user terminals information indicating an unloading facility for unloading the selected set of railcars;

transmitting the received information from the selected end user terminal to the server via the network;

processing the received information with the server to dynamically forecast an arrival time for the set of cars at a selected one of the loading and unloading facilities in response to events reported to the server by a train including the selected set of railcars during transit of the selected set of railcars between a starting one of the loading and unloading facilities and the selected one of the loading and unloading facilities;

communicating the dynamically forecasted arrival time from the server to the selected user terminal as updated in response to the reported events; and displaying the dynamically forecasted arrival time in a corresponding one of the loading facility and unloading facility arrival time fields of the graphical user interface on a display screen of the selected user terminal.

19. The method of claim 18, further comprising:

forecasting a loading time at the loading facility with the server;

forecasting a transit time from the loading facility to the unloading facility with the server;

forecasting an unloading time at the unloading facility with the server;

forecasting a transit time from the unloading to the loading facility with the server; communicating the forecasted loading, unloading, and transit times from the server to the selected end user terminal across the network; and displaying the forecasted loading, unloading, and transit times as a graph on the display screen of the selected end user terminal.

20. The method of claim 19, wherein displaying the forecasted loading, unloading, and transit times on a graph comprises displaying the forecasted loading, unloading, and transit times along with forecasted loading, unloading, and transit times for a plurality of sets carrying shipments between the loading facility and the unloading facility.

21. The method of claim 19, wherein displaying the forecasted loading, unloading, and transit times on a graph comprises displaying the forecasted loading and unloading times and transit times along with forecasted loading, unloading, and transit times for at least one other shipment being made by a selected set of railcars.

22. The method of claim 19, further comprising:

forecasting a queuing time for at least one of the loading and unloading facilities with the server; and displaying the forecasted queuing time on the graph on the display screen of the selected terminal in conjunction with the forecasted loading and unloading times and the forecasted transit times.

23. The method of claim 18, wherein processing the received information with the server to dynamically forecast an arrival time for the set of cars at a selected one of the loading and unloading facilities comprises:

determining from information received by the server a last reported event for the set travelling from a starting facility to the selected facility;

if the last reported event was the set placed for loading/unloading at the starting facility, forecasting the arrival time at the selected facility from the sum of:
  (a) a time period from the time the set was placed for loading/unloading at the starting facility to an estimated time of set loaded/unloaded release from the starting facility;
  (b) a time period from the estimated time of set loaded/unloaded release from the starting facility to an estimated time of set departure from the starting facility;
  (c) a time period from the estimated time of set departure from the starting facility to an estimated time the set is received from interchange; and
  (d) a time period from the estimated time the set is received from interchange to an estimated time to set arrival at selected facility;

if the last event was the set loaded/unloaded release from the starting facility, forecasting the arrival time to the selected facility from the sum of:
  (a) the time period from the time of set loaded/unloaded release to the estimated time of set departure from the starting facility;
  (b) the time period between the estimated time of the set departure from the starting facility to the estimated time the set is received from interchange; and
  (c) the time period between the estimated time the set is received from interchange to the estimated time to set arrival at selected facility;

if the last event was the set departure from the starting facility, forecasting the arrival time the selected facility from the sum of:
  (a) the time period between the time of the set departure from the starting facility to the estimated time the set is received from interchange; and
  (b) the time period between the estimated time the set is received from interchange to estimated time to the set arrival at selected facility; and if the last event was the set was received from interchange, forecasting the arrival time as the estimated time to the set arrival at selected facility.

24. The method of claim 18, further comprising forecasting the arrival time of the set of rail cars at the unloading facility with the server comprises:

determining if a minimum number of data points for transit times from the loading facility to the unloading facility are stored in memory associated with the server;

if the minimum number of data points are not stored in memory, calculating an average set transit time to the unloading facility as an average transit time to the unloading facility from a selected number of loading facilities within a selected geographical region; and if the minimum number of data points are stored in memory, calculating the average transit time from the loading facility to the unloading facility as the sum of:
  (a) an average time between set release at the loading facility to set departure from the loading facility;
  (b) an average time between set departure from the loading facility to set arrival at a selected one of the unloading facility and a destination;
  (c) a selected one of an average time from arrival at the unloading facility to spot at unloading facility and an average time from arrival at destination to interchange delivery to a foreign carrier;

(d) an average time between from set delivery for interchange with the foreign carrier to set spot arrival at the unloading facility; and (e) an average offline time between set arrival to set release at the unloading facility spent on the foreign carrier.

25. The method of claim 18, further comprising forecasting the arrival time at the loading facility with the server comprises:

determining if a minimum number of data points for transit times from the unloading facility to the loading facility are stored in memory;

if the minimum number of data points are not stored in memory, calculating an average transit time to the loading facility as an average transit time to the loading facility from a selected number of unloading facilities within a selected geographical region; and if the minimum number of data points are stored in memory, calculating the average transit time from the unloading facility to the unload facility as the sum of:

(a) an average time from release from unloading facility to return from foreign carrier;

(b) a selected one of an average time from release from the unloading facility to a selected one of a departure from the unloading facility and an average time from interchange from the foreign carrier;

(c) an average time from set departure from the unloading facility to set arrival at the loading facility; and (d) an average offline time from set release to foreign carrier to set departure from unloading facility.

26. The method of claim 19, further comprising forecasting queuing and dwell times for a selected facility with the server including:

determining from information stored in a database whether a customer owns a facility;

in response to a determination that the customer owns a facility, estimating queuing and dwell times based on first-in, first-out status;

in response to a determination that the customer does not own a facility, estimating the dwell time as the average dwell time at the facility for all active trains and estimating queuing time as the average queuing time at the facility for all active trains.

27. The method of claim 18, further comprising:

receiving through the user terminal a crude oil throughput goal, a number of cars per set, and a number of barrels per car;

calculating with the server a number of barrels per train as the product of the number of cars per set and the number of barrels per car; and calculating with the server a number of shipments required to meet the throughput goal by dividing the crude throughput goal by the number of barrels per train;

communicating information representing the number of shipments required to meet the throughput goal from the server to the end user terminal; and displaying the number of shipments required to meet the throughput goal on the display of the end user terminal.

28. The method of claim 18, further comprising:

receiving through the user terminal information representing a crude throughput goal, a number of barrels per car, a number of cars per set, and a number of days in a planning horizon;

calculating with the server a crude flow rate per day by dividing the crude throughput goal by a number of days in the planning horizon;

calculating with the server an average total cycle time as the sum of:

(a) an average time at a loading facility;

(b) an average transit time from the loading facility to an unloading facility;

(c) an average time at the unloading facility; and (d) an average transit time from the unloading facility to the loading facility;

calculating with the server a number of barrels per set as a product of the number of cars per set and the number of barrels per car;

calculating with the server the number of sets required to meet the throughput goal by taking a product of the average cycle time and the crude flow per day and dividing the result by the number of barrels per set; and displaying the number of sets required to meet the throughput goal on the display of the end user terminal.

29. The method of claim 18, further comprising: determining with the server if a customer owns a facility;

in response to a determination that the customer owns a facility, calculating with the server sets available to the customer as the sum of a number of sets loaded or unloaded at the customer facility in a most recent cycle and a number of sets assigned to the customer in a database.

30. The method of claim 18, further comprising:

storing in a database a plurality of shipment schedules for shipping crude between at least one loading facility and at least one unloading facility, each schedule corresponding to a set and including estimated arrival time for the set at a corresponding loading facility and an estimated arrival time for the set at a corresponding current unloading facility;

receiving through the user terminal information representing a new shipment to a particular unloading facility for arrival on a particular date;

for each loading facility, calculating with the server a theoretical arrival time to the particular unloading facility; and displaying on the display screen of the user terminal a selected one of the sets as a best option for shipping crude from the corresponding loading facility to the particular unloading facility in lieu of the corresponding current unloading facility.

31. The method of claim 18, further comprising:

receiving information through the user terminal representing a hourly inflow of crude to the loading and a current tank level at the loading facility;

calculating with the server an hourly crude inflow rate to the loading facility as the sum of the hourly inflow rate by truck and the hourly inflow rate by pipe;

calculating with the server an hourly tank level at the loading facility as the sum of the current tank level and the hourly crude inflow rate minus an hourly crude outflow rate by rail; and graphically display the hourly tank level at the loading facility on the display screen of the user terminal.

32. The method of claim 18, further comprising:

receiving information through the user interface representing a hourly outflow of crude from the unloading and a current tank level at the unloading facility;

calculating with the server an hourly crude outflow rate from the unloading facility as the sum of the hourly outflow rate by truck and the hourly outflow rate by pipe;

calculating with the server an hourly tank level at the unloading facility as the sum of the current tank level and the hourly crude inflow rate by rail minus an hourly crude outflow rate; and graphically display the hourly tank level at the loading facility on the display screen of the user terminal.

\* \* \* \* \*